United States Patent
Teranishi

(10) Patent No.: US 12,045,340 B2
(45) Date of Patent: Jul. 23, 2024

(54) METHOD FOR UPDATING A NEURAL NETWORK, TERMINAL APPARATUS, COMPUTATION APPARATUS, AND PROGRAM

(71) Applicant: NEC Corporation, Tokyo (JP)

(72) Inventor: Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 240 days.

(21) Appl. No.: 17/780,249

(22) PCT Filed: Nov. 26, 2019

(86) PCT No.: PCT/JP2019/046169
§ 371 (c)(1),
(2) Date: May 26, 2022

(87) PCT Pub. No.: WO2021/106077
PCT Pub. Date: Jun. 3, 2021

(65) Prior Publication Data
US 2022/0414208 A1    Dec. 29, 2022

(51) Int. Cl.
*G06F 21/55*     (2013.01)
*G06N 3/045*    (2023.01)
*G06N 3/08*     (2023.01)

(52) U.S. Cl.
CPC ........... *G06F 21/552* (2013.01); *G06N 3/045* (2023.01); *G06N 3/08* (2013.01); *G06F 2221/034* (2013.01)

(58) Field of Classification Search
CPC . G06F 2221/034; G06F 21/552; G06N 3/045; G06N 3/08
See application file for complete search history.

(56) References Cited

U.S. PATENT DOCUMENTS

| | | | | |
|---|---|---|---|---|
| 10,644,876 B2* | 5/2020 | Williams | ............... | H04L 9/0861 |
| 11,710,029 B2* | 7/2023 | Ooi | ........................... | G06N 3/08 |
| | | | | 706/25 |

(Continued)

FOREIGN PATENT DOCUMENTS

| | | | | |
|---|---|---|---|---|
| EP | 4012593 A1 * | 6/2022 | ........... | G06F 21/602 |
| JP | 2017-174298 A | 9/2017 | | |

(Continued)

OTHER PUBLICATIONS

International Search Report for PCT Application No. PCT/JP2019/046169, mailed on Feb. 4, 2020.

(Continued)

*Primary Examiner* — Sargon N Nano

(57) ABSTRACT

The terminal apparatus comprises a machine learning part that can execute a process of computing a first model update parameter of a first neural network using training data and a process of computing a second model update parameter of a second neural network using training data for a simulated attack; an encryption processing part that encrypts the first, the second model update parameter using a predetermined homomorphic encryption; a data transmission part that transmits the encrypted first, second model update parameters to a predetermined computation apparatus; and an update part that receives from the computation apparatus model update parameters of the first, the second neural networks computed using the first, the second model update parameters received from another terminal apparatus and updates the first, the second neural networks.

13 Claims, 7 Drawing Sheets

(56) References Cited

U.S. PATENT DOCUMENTS

| | | | |
|---|---|---|---|
| 11,861,499 B2* | 1/2024 | Song | G06N 3/0495 |
| 2016/0350648 A1* | 12/2016 | Gilad-Bachrach | G06N 3/08 |
| 2017/0372201 A1* | 12/2017 | Gupta | G06N 20/00 |
| 2019/0012595 A1* | 1/2019 | Beser | G06N 3/08 |
| 2019/0042937 A1* | 2/2019 | Sheller | G06N 3/08 |
| 2019/0394215 A1* | 12/2019 | Lee | G06N 20/00 |
| 2020/0082259 A1* | 3/2020 | Gu | G06N 3/08 |
| 2021/0073393 A1* | 3/2021 | Jacobson | G06F 21/602 |

FOREIGN PATENT DOCUMENTS

| | | |
|---|---|---|
| JP | 2019-028656 A | 2/2019 |
| JP | 2019-053542 A | 4/2019 |

OTHER PUBLICATIONS

Reza et al., "Membership Inference Attacks Against Machine Learning Models," IEEE Symposium on Security and Privacy 2017, pp. 3-18.

Milad et al., "Machine Learning with Membership Privacy using Adversarial Regularization", CCS '18: Proceedings of the 2018 ACM SIGSAC Conference on Computer and Communications Security. Oct. 2018, pp. 1-14.

Keith et al., "Practical Secure Aggregation for Privacy-Preserving Machine Learning", CCS'17, Oct. 30-Nov. 3, 2017, Dallas, TX, USA, pp. 1175-1191.

* cited by examiner

METHOD FOR UPDATING A NEURAL NETWORK, TERMINAL APPARATUS, COMPUTATION APPARATUS, AND PROGRAM

BACKGROUND

This application is a National Stage Entry of PCT/JP2011/003689 filed on Jun. 28, 2011, which claims priority from Japanese Patent Application 2010-235283 filed on Oct. 20, 2010, the contents of all of which are incorporated herein by reference, in their entirety.

TECHNICAL FIELD

The present invention relates to a method for updating a neural network, terminal apparatus, computation apparatus, and program.

BACKGROUND

In recent years, a type of machine learning called Federated Learning, in which devices perform machine learning and a server receives model update parameters from these devices to update a neural network model, has attracted attention. Since it is not necessary to collect training data in Federated Learning, it is considered to be possible to protect privacy and reduce the amount of data communication.

Patent Literatures 1 and 2 describe a configuration in which machine learning is performed by the client/server configuration described above. For instance, Patent Literature 1 discloses a configuration that includes a terminal apparatus that transmits weight parameters obtained by learning to a management apparatus, and the management apparatus that receives the weight parameters from a plurality of the terminal apparatuses and selects an optimal weight parameter. Patent Literature 2 proposes a configuration in which training data is more highly confidential personal data, in the configuration described above.

Non-Patent Literature 1 discloses a method called inference attacks that leak personal information under the condition where access to an inference algorithm is possible. The basic idea thereof is as follows. First, the attacker prepares a training dataset T and a set T'= $\{(x'^{(1)}, y'^{(1)}), \ldots, (x'^{(N)}, y'^{(N)})\}$ comprised of the same type of training data as that of the dataset T. For instance, if T is a set comprised of face images and the feature values thereof, the attacker can create T' by collecting face images from the Internet, and so on. Then, the attacker supplies $x'^{(n')}$ where for n'=1, 2, ..., as inputs into an inference algorithm determines to what extent the inference result Infer ($\alpha$, w, $x'^{(n')}$) matches $y'^{(n')}$, and determines that highly matching data has a high degree of similarity to the data in T. As a result, the attacker is able to infer to some extent what kind of data is in T.

Non-Patent Literature 2 proposes a learning algorithm resistant to attacks like the one described in Non-Patent Literature 1.

[Patent Literature 1] JP2017-174298A
[Patent Literature 2] JP2019-28656A
[Non-Patent Literature 1] Reza Shokri, Marco Stronati, Congzheng Song, Vitaly Shmatikov, "Membership Inference Attacks Against Machine Learning Models," IEEE Symposium on Security and Privacy 2017: 3-18, [online], [searched on Nov. 21, 2019], the Internet <URL: https://arxiv.org/pdf/1610.05820.pdf>

[Non-Patent Literature 2] Milad Nasr, Reza Shokri, Amir Houmansadr, "Machine Learning with Membership Privacy using Adversarial Regularization," [online], [searched on Nov. 21, 2019], the Internet <URL: https://arxiv.org/pdf/1807.05852.pdf>

SUMMARY

The following analysis is given by the inventor of the present invention. As described in Background, in the configuration where machine learning is performed in a client/server configuration, information on training data possessed by a client may leak through the model update parameters disclosed by the client. If the training data is related to personal information, it means that this will lead to personal information leakage.

As one of the countermeasures against such attacks, a method that adds noise to data to be transmitted to a server, such as Differential Privacy, is considered. An attempt to ensure sufficient privacy by the method that adds noise, however, may end up degrading learning accuracy. Further, when data derived from personal devices such as smartphones, and so on is used as training data, information may leak due to its biases.

In this regard, by using the method of Non-Patent Literature 2, it is possible to increase the resistance to Inference Attacks. Non-Patent Literature 2, however, does not mention any application of the method to machine learning in which learning is performed by collecting model update parameters computed by individual terminal apparatuses.

It is an object of the present invention to provide a method for updating a neural network, terminal apparatus, computation apparatus, and program that can contribute to improving the resistance to Inference attacks for machine learning in a form of learning which is performed by collecting model update parameters computed by individual terminal apparatuses.

According to a first aspect, there is provided a terminal apparatus comprising a machine learning part that can execute a process of computing a first model update parameter of a first neural network using training data and a process of computing a second model update parameter of a second neural network, which is different from the first neural network, using training data for a simulated attack, which is different from the training data; an encryption processing part that encrypts the first, [and/or] the second model update parameter using a predetermined homomorphic encryption; a data transmission part that transmits the encrypted first, second model update parameter to a predetermined computation apparatus; and an update part that receives from the computation apparatus model update parameter of the first, the second neural network computed using the first, the second model update parameter received from another terminal apparatus and updates the first, the second neural network.

According to a second aspect, there is provided a computation apparatus capable of communicating with the terminal apparatus as described above, the computation apparatus comprising a computation part that computes the model update parameters of the first, the second neural network using the first, the second model update parameter received from the terminal apparatus; and a transmission part that transmits updated model update parameter of the first, the second neural network to the terminal apparatus.

According to a third aspect, there is provided a method for updating a neural network including executing a process of computing a first model update parameter of a first neural network using training data and a process of computing a second model update parameter of a second neural network, which is different from the first neural network, using training data for a simulated attack, which is different from the training data; encrypting the first, the second model update parameter using a predetermined homomorphic encryption; transmitting the encrypted first, second model update parameter to a predetermined computation apparatus; and receiving from the computation apparatus model update parameter of the first, the second neural network computed using the first, the second model update parameter received from another terminal apparatus and updating the first, the second neural network. The present method is tied to a particular machine, namely a computer that computes a model update parameter of a neural network using training data.

According to a fourth aspect, there is provided a computer program for realizing the functions of the terminal apparatus as described above. The program is supplied to a computer apparatus using an input device or from the outside via a communication interface, is stored in a storage device, operates a processor according to predetermined steps or processes, is capable of displaying the processing results thereof including an intermediate state as necessary via a display device step by step, or is able to communicate with the outside via the communication interface. For instance, the computer apparatus for this purpose comprises a processor, a storage device, an input device, a communication interface, and a display device, if necessary, that can typically be connectable to each other by a bus. Further, this program can be stored in a computer-readable (non-transitory) storage medium.

According to the present invention, it becomes possible to improve the resistance to Inference attacks for machine learning in a form of learning which is performed by collecting model update parameters computed by individual terminal apparatuses.

EXAMPLE EMBODIMENTS

Figure 1:
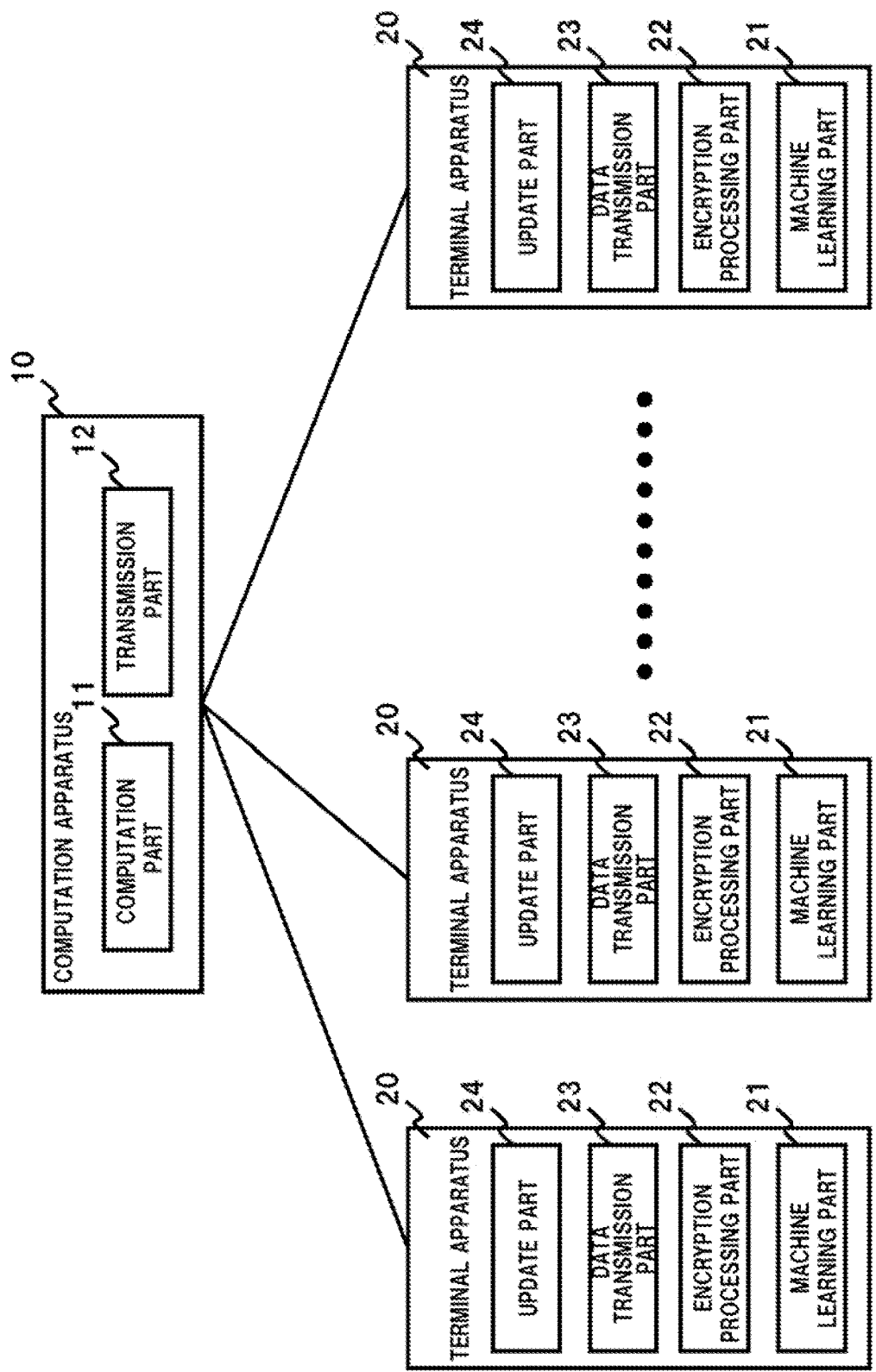
FIG. 1 is a drawing illustrating the configuration of an example embodiment of the present invention.

First, an outline of an example embodiment of the present invention will be given with reference to the drawings. It should be noted that the drawing reference signs in the outline are given to each element for convenience as an example to facilitate understanding and are not intended to limit the present invention to the illustrated modes. Further, connection lines between blocks in the drawings referred to in the following description can be both bidirectional and unidirectional. A unidirectional arrow schematically shows the flow of a main signal (data) and does not exclude bidirectionality. A program is executed by a computer apparatus and the computer apparatus comprises, for instance, a processor, storage device, input device, communication interface, and a display device as necessary. Further, the computer apparatus is configured to be able to perform wired or wireless communication with an internal device therein or external device (including a computer) via the communication interface. Although the input/output connection points of each block in the drawings have ports or interfaces, these are not illustrated. Further, in the following description, "A and/or B" means A or B, or A and B.

The present invention can be realized, in an example embodiment, by a terminal apparatus 20 comprising a machine learning part 21, an encryption processing part 22, a data transmission part 23, and update part 24, as shown in FIG. 1.

Concretely, the machine learning part 21 is configured to be able to execute a process of computing a first model update parameter of a first neural network using training data and a process of computing a second model update parameter of a second neural network, which is different from the first neural network, using training data for a simulated attack, which is different from the training data mentioned above.

The encryption processing part 22 encrypts one or two of the computed first and second model update parameters using a predetermined homomorphic encryption scheme. For instance, when a model update parameter computed by a terminal apparatus m is denoted by $\Delta m$ and homomorphic encryption is denoted by $Enc(x)$, the encrypted model update parameter is denoted by $Enc(\Delta m)$.

Figure 2:
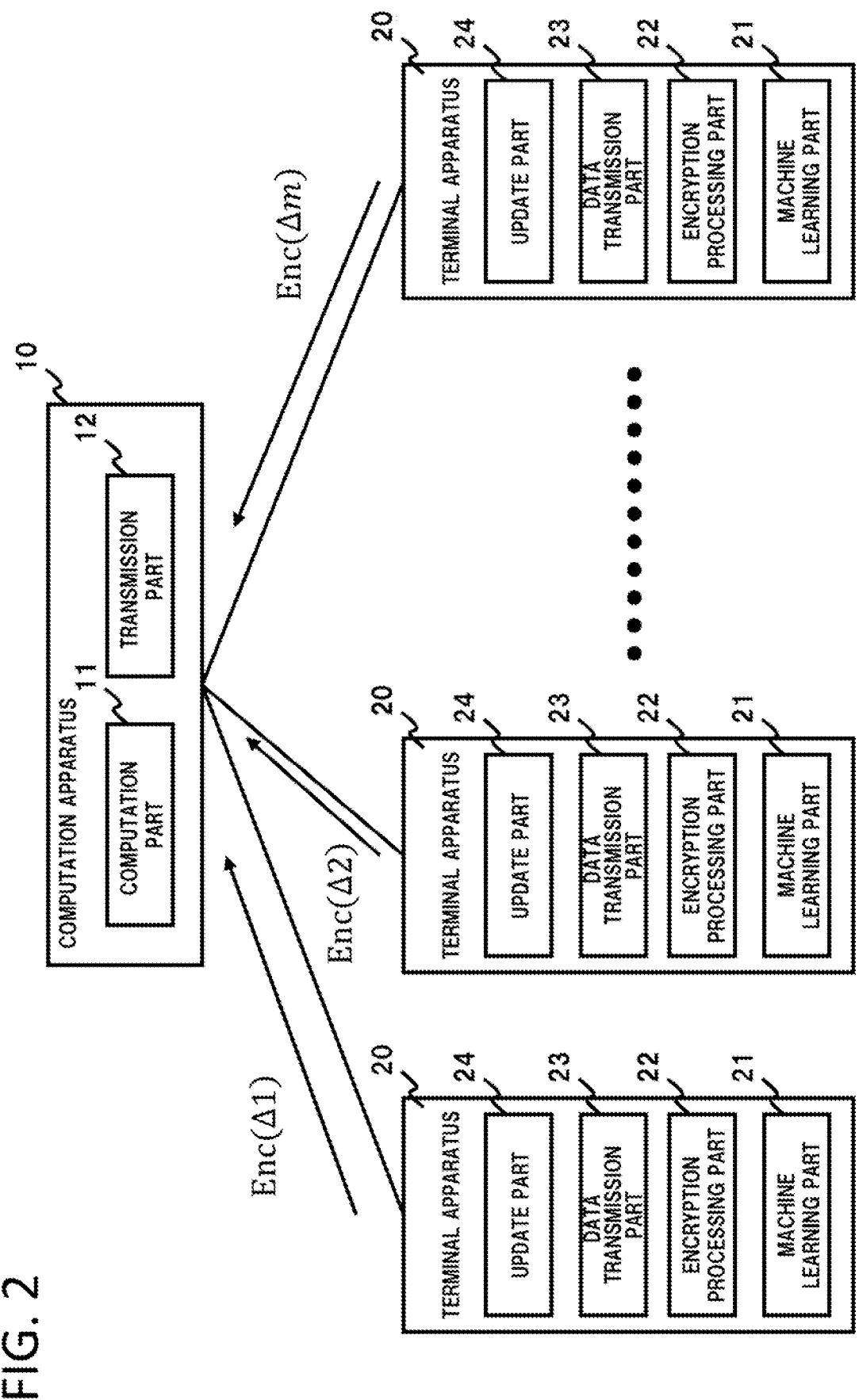
FIG. 2 is a drawing for explaining the operation of an example embodiment of the present invention.

The data transmission part 23 transmits the encrypted model update parameter to a predetermined computation apparatus 10, as shown in FIG. 2. For instance, the terminal apparatus 20 on the left end in FIG. 2 transmits a model update parameter $Enc(\Delta 1)$. The terminal apparatus 20 on the right end in FIG. 2 transmits a model update parameter $Enc(\Delta m)$.

Upon receiving the model update parameters $Enc(\Delta 1)$ and/or $Enc(\Delta m)$, the computation apparatus 10 computes model update parameter $\Delta$ of the first, the second neural network using the received first, second model update parameters. Since the model update parameter $Enc(\Delta 1)$ is encrypted using homomorphic encryption, the model update parameters $\Delta$ of the neural networks can be computed in an encrypted state.

Figure 3:
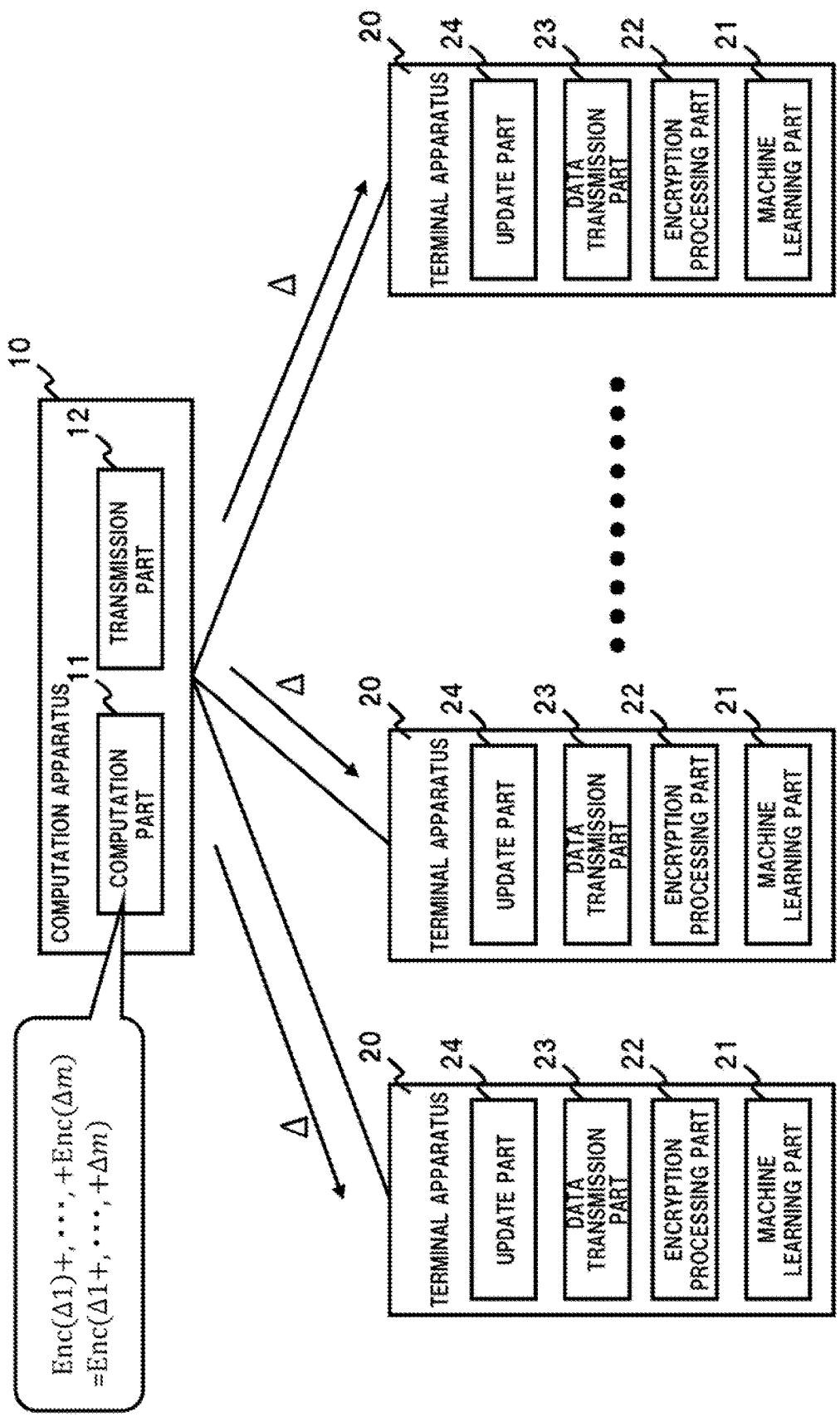
FIG. 3 is a drawing for explaining the operation of an example embodiment of the present invention.

Then, as shown in FIG. 3, the computation apparatus 10 transmits the updated model update parameters $\Delta$ of the neural networks to the terminal apparatuses 20.

The update part 24 of the terminal apparatus 20 receives the updated model update parameter $\Delta$ of the first, the second neural networks from the computation apparatus 10 and updates the neural network corresponding to the received model update parameter $\Delta$.

As described, according to the present example embodiment, a model update parameter to be transmitted from the terminal apparatus 20 to the computation apparatus 10 is encrypted and then transmitted and a model update parameter is also calculated in the computation apparatus 10 without being decrypted. Further, since the machine learning part 21 performs learning using the training data for a simulated attack, in addition to learning using the primary training data, the resistance to Inference attacks will be greatly improved.

First Example Embodiment

Figure 4:
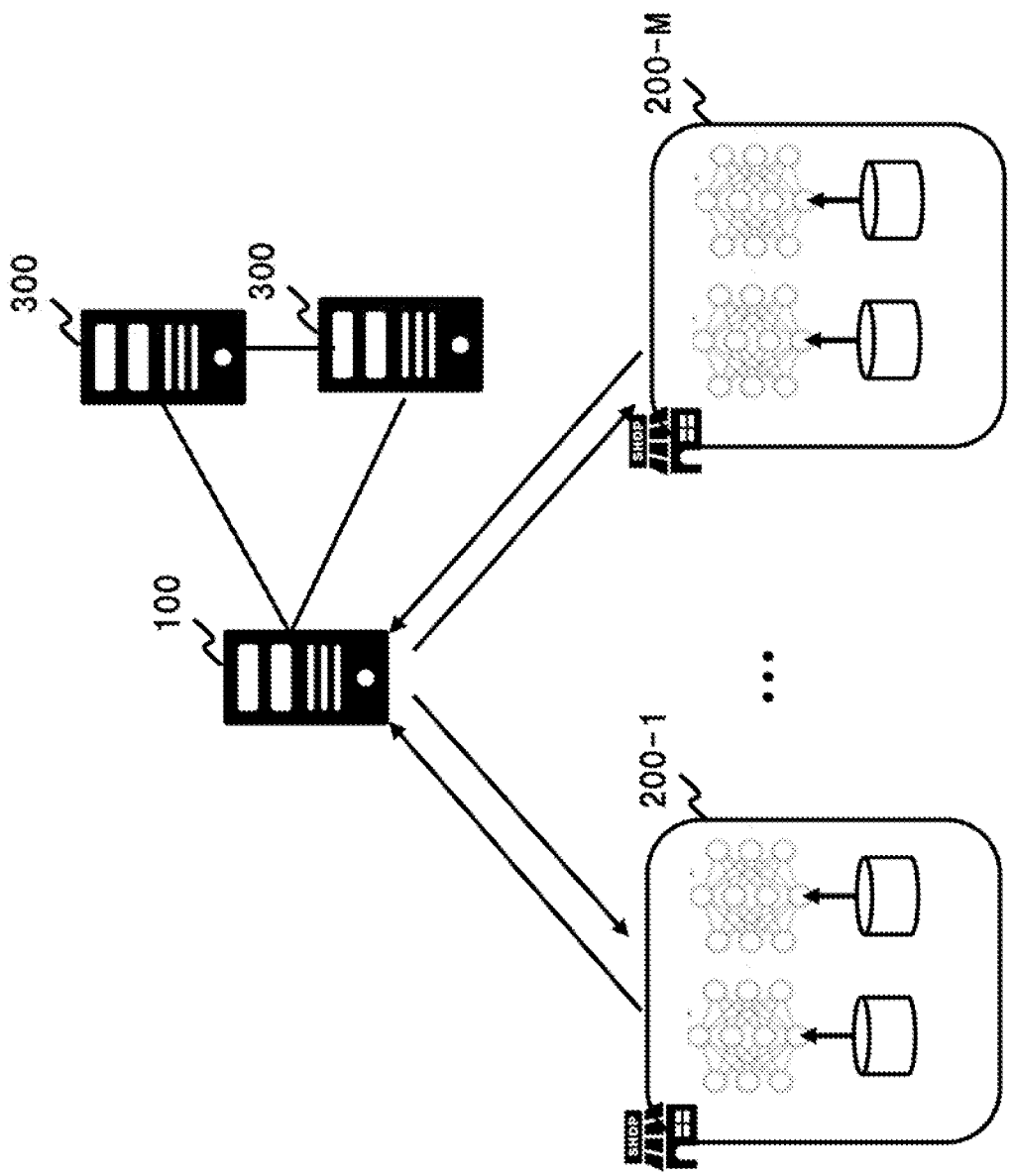
FIG. 4 is a drawing illustrating the configuration of a first example embodiment of the present invention.

With reference to the drawings, the following describes in detail a first example embodiment of the present invention, in which terminal apparatuses and a computation apparatus (server) share a hyperparameter and perform Horizontal Federated Learning. FIG. 4 is a drawing illustrating the configuration of the first example embodiment of the present invention. With reference to FIG. 4, a configuration is shown, in which a server 100 is connected to M terminal apparatuses 200-1 to 200-M capable of transmitting a model update parameter to the server 100 and receiving a model update parameter computed by the server 100. Note that the terminal apparatuses 200-1 to 200-M are referred to as the terminal apparatus 200 hereinafter when it is not particularly necessary to distinguish each of them.

Further, the server 100 is connected to a plurality of subservers 300 and, in cooperation with these subservers 300, is capable of performing threshold decryption on data encrypted using additive homomorphic encryption described later.

Figure 5:
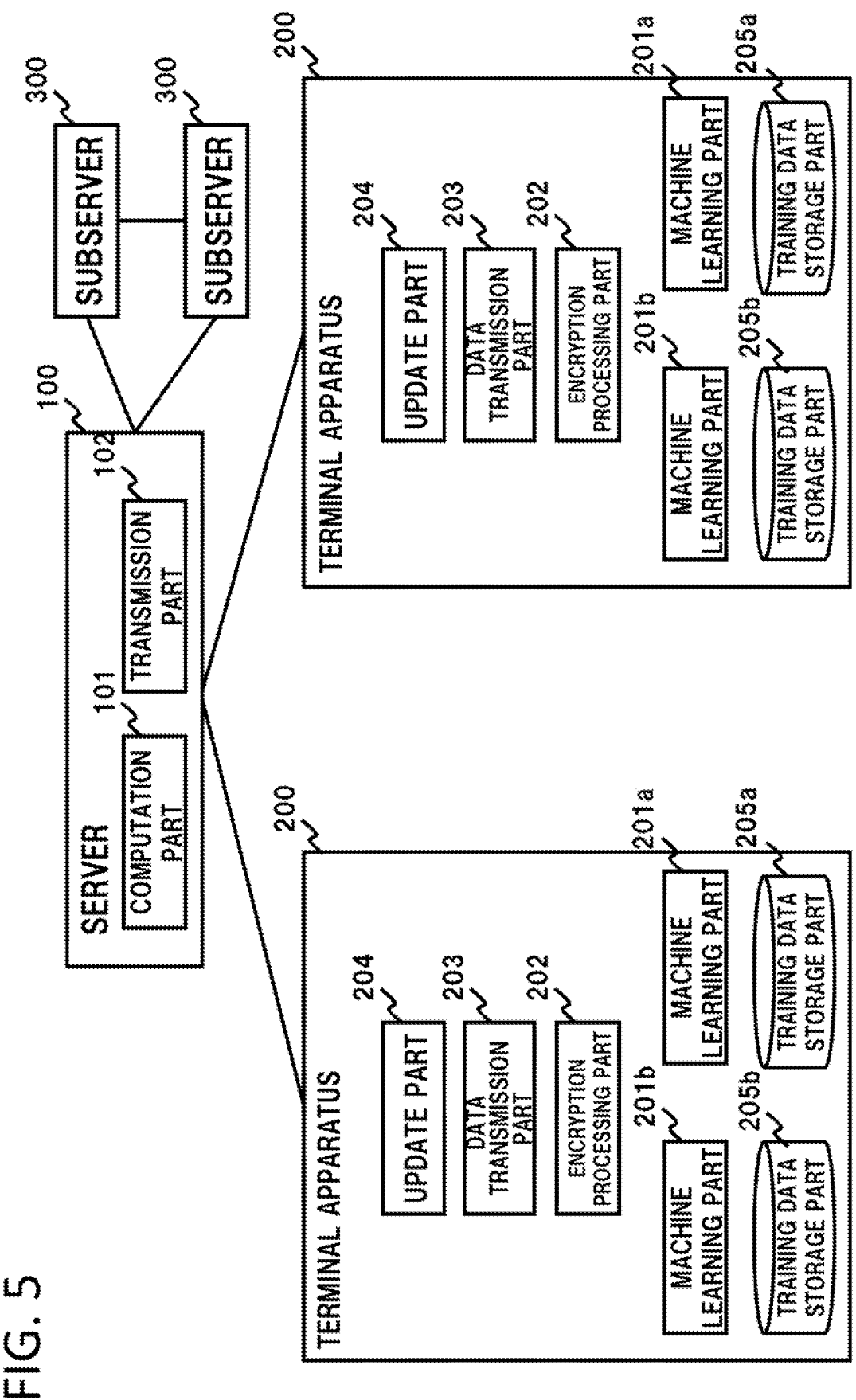
FIG. 5 is a functional block diagram illustrating a detailed configuration of the first example embodiment of the present invention.

FIG. 5 is a functional block diagram illustrating a detailed configuration of the first example embodiment of the present invention. With reference to FIG. 5, the terminal apparatus 200 comprises machine learning parts 201a and 201b, an encryption processing part 202, a data transmission part 203, an update part 204, and training data storage parts 205a and 205b. Note that various electronic apparatuses (devices) capable of sharing a hyperparameter described later and computing a model update parameter may be used as such terminal apparatus 200. Examples of such electronic apparatuses (devices) can be smartphones, personal computers, tablet terminals, and so on.

In the present example embodiment, two neural networks are provided in order to improve the resistance to Inference attacks. The first neural network is a neural network for learning a primary training dataset. Inference is performed using this neural network. The second neural network is a neural network for launching a simulated attack on the first neural network. In the present example embodiment, learning is performed while operating these two neural networks alternately. In the following description, in order to distinguish these networks, the first neural network will be referred to as an utilized neural network, and the second neural network as an attacking neural network. Hereinafter, let a hyperparameter of the utilized neural network be a, and let a hyperparameter of the attacking neural network be $\alpha'$. The attacking neural network may be configured by using the method described in Non-Patent Literature 2.

For convenience of explanation, the following description assumes that the terminal apparatus 200 of the present example embodiment comprises the two machine learning parts 201a and 201b and the two training data storage parts 205a and 205b to deal with the two neural networks as described above.

The training data storage part 205a stores a training dataset to be learned by the utilized neural network. In the following description, this training dataset is denoted by $T=\{(x^{(1)}, y^{(1)}), \ldots, (x^{(N)}, y^{(N)})\}$.

The training data storage part 205b stores a training dataset used to launch a simulated attack using the attacking neural network. In the following description, this training dataset is denoted by $T'=\{(x'^{(1)}, y'^{(1)}), \ldots, (x'^{(N')}, y'^{(N')})\}$.

Note that it is assumed that each of $x^{(N)}$, $x'^{(N')}$ is an element of the same set X. Likewise, it is assumed that each of $y^{(N)}$, $y'^{(N')}$ is an element of the same set Y.

Further, in an advance preparation, the hyperparameters $\alpha$ and $\alpha'$ as described above are assumed to be determined by using a method of some kind. For instance, one method for determining the hyperparameters may be diverting a known hyperparameter $\alpha$ of a neural network. It goes without saying that the method for determining the hyperparameters $\alpha$ and $\alpha'$ is not limited thereto, and the parameters may be set according to the use of the neural network and the specifications of the server 100 and the terminal apparatus 200.

Further, epoch t is initialized to 1, and a model parameter initial value $w^{[1]}$ is initialized by using a method of some kind. Various methods may be employed as an initialization method, depending on the design of the neural network.

It is assumed that the server 100 and the terminal apparatus 200 share the hyperparameters $\alpha$ and $\alpha'$ in advance. As a sharing method, for instance, it is possible to employ a method in which the server 100 transmit $\alpha$, $\alpha'$ to each terminal apparatus 200 in advance, or a method in which $\alpha$, $\alpha'$ have been written into a program to be installed on the terminal apparatus 200 in advance, and so on. Furthermore, likewise, it is assumed that the server 100 and the terminal apparatus 200 share the initial values $w^{[1]}$, $w'^{[1]}$ of model parameters in advance using a method of some kind.

The following description assumes that the machine learning part 201a trains the utilized neural network using a training dataset T and the machine learning part 201b trains the attacking neural network using a training dataset T'.

The server 100 creates a public key/secret key pair (pk, sk) using a preset key generation algorithm Gen ($\kappa$) of additive homomorphic encryption and transmits the public key pk to all the terminal apparatuses 200 in advance. Note that the Okamoto-Uchiyama cryptosystem, the Paillier cryptosystem, the Damgaard-Jurik cryptosystem and the like may be used as an additive homomorphic cryptosystem.

Using the public key pk, the encryption processing part 202 encrypts a model update parameter computed by the machine learning part 201a. It is assumed that the server 100 and the subservers 300 hold respectively secret keys $sk_0$, $sk_1$ corresponding to the public key pk.

The data transmission part 203 transmits the model update parameter encrypted by the encryption processing part 202 to the server 100.

The update part 204 updates the utilized neural network or the attacking neural network by using model update parameters $\Delta^{[t]}$, $\Delta'^{[t, a]}$ received from the server 100. The details of this will be described later together with a concrete operation.

The server 100 comprises a computation part 101 and a transmission part 102. The computation part 101 tallies the encrypted model update parameters transmitted from the terminal apparatus 200. Further, the server 100, in cooperation with the subservers 300, decrypts the encrypted model update parameters to compute the model update parameters $\Delta^{[t]}$, $\Delta'^{[t, a]}$.

The transmission part 102 transmits the model update parameters $\Delta^{[t]}$, $\Delta'^{[t, a]}$ computed by the computation part 101 to each terminal apparatus 200.

Figure 6:
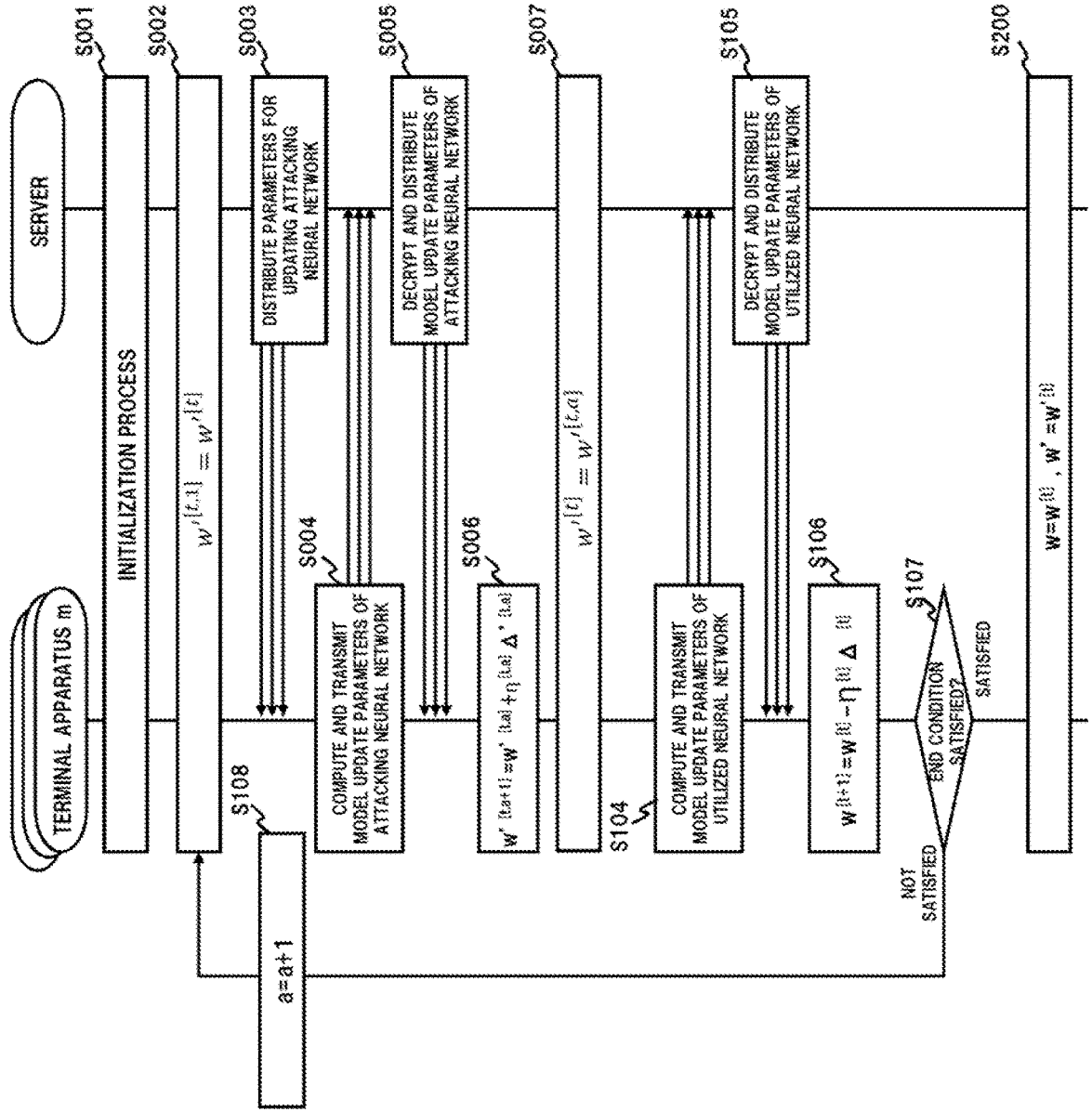
FIG. 6 is a sequence diagram illustrating the operation of the first example embodiment of the present invention.

Next, the operation of the present example embodiment will be described in detail with reference to the drawings. FIG. 6 is a sequence diagram illustrating the operation of the first example embodiment of the present invention.

In the following description, c and A are predetermined constants. Further, it is assumed that a learning rate $\eta'^{[t, a]}$ is shared by the server 100 and all the terminal apparatuses 200. Also, a learning rate $\eta^{[t]}$ is a real number that determines the variability of the value of $w^{[t]}$ in a loop. There are various ways to determine the learning rates $\eta'^{[t, a]}$ and $\eta'^{[t]}$, depending on the design of the neural network, but since any value may be used in the present invention, the description thereof will be omitted.

With reference to FIG. 6, the server 100 and all the terminal apparatuses 200 first set t=1 and initialize $w^{[1]}$, $w'^{[1]}$ (step S001).

The server 100 and all the terminal apparatuses 200 repeat steps S002 to S106 described below until $w^{[t]}$ satisfies an end condition. As the end condition, for instance, a condition can be set such that a loop is terminated when $(w^{[t+1]} - w^{[t]})^2$ becomes smaller than a predetermined value. The end condition is not limited thereto, and one suitable for the neural network may be used.

The server 100 and all the terminal apparatuses 200 set $w'^{[t, 1]} = w'^{[t]}$ m (step S002).

The server 100 executes the processes below for a=1, . . . , A, and distributes parameters for updating the attacking neural network to the terminal apparatuses 200 (step S003).

The server 100 selects a non-negative integer from $c'^{(1)}, \ldots, c'^{(M)}$ that satisfies $c'^{(1)} + \ldots + c'^{(M)} = c$.

The server 100 selects a non-negative integer from $c'^{(0)}, \ldots, c'^{(M)}$ that satisfies $c'^{(0)} + \ldots + c'^{(M)} = c$.

The server 100 randomly selects a c-element subset $B'^{[0, t, a]}$ of T'.

After computing $D^{[0, t, a]}$ using the following [Expression 1], the server 100 computes $\Delta'^{[0, t, a]}$ using [Expression 2]. Note that Infer(x) in [Expression 2] denotes an inference algorithm that receives the hyperparameter α, the parameter w, and data x as inputs and outputs inference results. This $\Delta'^{[0, t, a]}$ is the initial value of the model update parameter.

$$D^{[0,t,a]} = \{((x,y, \text{Infer}(a, w^{[t]}, x)), 1) | (x,y) \in B'^{[0,t,a]}\} \quad \text{[Expression 1]}$$

$$\Delta'^{[0,t,a]} = \frac{1}{c} \sum_{((x,y,\hat{y}),d) \in D^{[0,t,a]}} \nabla_{w'_*} \log(|\text{Infer}(\alpha', w'^{[t,a]}, x, y, \hat{y}) - d|) \quad \text{[Expression 2]}$$

The server 100 transmits $(c^{(m)}, c'^{(m)})$ to the terminal apparatuses m (m=1, . . . , M).

The m terminal apparatuses 200 (m=1, . . . , M) execute the following processes to compute and transmit the model update parameters of the attacking neural network (step S004).

The terminal apparatus 200 receives $(c^{(m)}, c'^{(m)})$.

The machine learning part 201b of the terminal apparatus 200 randomly selects a $c^{(m)}$-element subset $B'^{[m, t, a]}$ of $T^{(m)}$. Here, $T^{(m)}$ denotes a training dataset held by the terminal apparatus m.

The machine learning part 201b of the terminal apparatus 200 randomly selects a $c'^{(m)}$-element subset $B'^{[m, t, a]}$ of $T'^{(m)}$.

After computing $D^{[m, t, a]}$ using the following [Expression 3], the machine learning part 201b of the terminal apparatus 200 computes the model update parameter $\Delta'^{[m, t, a]}$ of the terminal apparatus m at epoch t using [Expression 4].

$$D^{[m,t,a]} = \{((a, w^{[t]}, x)), 0) | (x,y) \in B^{[m,t,a]}\} \cup \{((x,y, \text{Infer}(a, w^{[t]}, x)), 1) | (x,y) \in B'^{[m,t,a]}\} \quad \text{[Expression 3]}$$

$$\Delta'^{[m,t,a]} = \frac{1}{c} \sum_{((x,y,\hat{y}),d) \in D^{[m,t,a]}} \nabla_{w'_*} \log(|\text{Infer}(\alpha', w'^{[m,t,a]}, x, y, \hat{y}) - d|) \quad \text{[Expression 4]}$$

The terminal apparatus 200 encrypts the model update parameter $\Delta'^{[m,t,a]}$ using the public key pk of additive homomorphic encryption distributed in advance and transmits Enc(pk, $\Delta'^{[m, t, a]}$) to the server 100.

The server 100 decrypts and distributes the model update parameters of the attacking neural network using Enc(pk, $\Delta'^{[m, t, a]}$) received from the terminal apparatus 200 (step S005). Concretely, the server 100 computes Enc(pk, $\Delta'^{[1, t, a]}$)+ . . . + Enc(pk, $\Delta'^{[M, t, a]}$) received from the terminal apparatuses 200. As stated above, since Enc(pk, $\Delta'^{[m, t, a]}$) is encrypted using additive homomorphic encryption, Enc(pk, $\Delta'^{[1, t, a]}$)+ . . . + Enc(pk, $\Delta'^{[M, t, a]}$) can be computed by tallying Enc(pk, $\Delta'^{[m, t, a]}$) in an encrypted state.

Further, the server 100 performs threshold decryption on the computation result in cooperation with the subservers 300 holding the secret key $sk_1$ to obtain a decryption result $\Delta'^{[t, a]}$. As for the threshold decryption, a scheme referred to the k-out-of-n secret sharing scheme, in which original information can be reconstructed from k pieces of share data corresponding a threshold value out of n pieces of share data, may be used.

Then, the server 100 transmits the decryption result $\Delta'^{[t, a]}$ to all the terminal apparatuses 200.

Upon receiving the decryption result $\Delta'^{[t, a]}$, the terminal apparatus 200 computes $w'^{[t, a+1]} = w'^{[t, a]} + \eta^{[t, a]} \Delta'^{[t, a]}$ (step S006).

Next, the server 100 and all the terminal apparatuses 200 set $w'^{[t]} = w'^{[t, a]}$ (step S007).

Next, the m terminal apparatuses 200 (m=1, . . . , M) execute the following processes to compute and transmit the model update parameters of the utilized neural network (step S104).

The machine learning part 201a of the terminal apparatus 200 randomly selects a $c^{(m)}$-element subset $B^{[m, t]}$ of $T^{(m)}$. Here, $T^{(m)}$ denotes the training dataset held by the terminal apparatus m.

The machine learning part 201a of the terminal apparatus 200 computes model update parameters $\Delta^{[m, t]}$ of the terminal apparatuses m at epoch t using the following [Expression 5].

$$\Delta^{[m,t]} = \frac{1}{c} \sum_{(x,y) \in B^{[m,t]}} (\nabla_{w_*} E_+(\alpha, w^{[t]}, x, y) + \lambda \nabla_{w_*} \log(\text{Infer}(\alpha', w'^{[t]}, x, y, \text{Infer}(\alpha, w^{[t]}, x)))) \quad \text{[Expression 5]}$$

The terminal apparatus 200 encrypts the model update parameters $\Delta^{[m, t]}$ using the public key pk of additive homomorphic encryption distributed in advance and transmits Enc(pk, $\Delta^{[m, t]}$) to the server 100.

The server 100 decrypts and distributes the model update parameters of the utilized neural network using Enc(pk, $\Delta^{[m, t]}$) received from the terminal apparatus 200 (step S105). Concretely, the server 100 computes Enc(pk, $\Delta^{[1, t]}$)+ . . . + Enc(pk, $\Delta^{[M, t]}$) received from the terminal apparatuses 200. As stated above, since Enc(pk, $\Delta^{[m, t]}$) is encrypted using additive homomorphic encryption, Enc(pk, $\Delta^{[m, t]}$)+ . . . + Enc(pk, $\Delta^{[M, t]}$) can be computed by tallying Enc(pk, $\Delta^{[t]}$) in an encrypted state.

Further, the server 100 performs threshold decryption on the computation result in cooperation with the subservers 300 holding the secret key $sk_1$ to obtain a decryption result $\Delta'^{[t]}$. Then, the server 100 transmits the decryption result $\Delta'^{[t]}$ to all the terminal apparatuses 200.

Upon receiving the decryption result $\Delta'^{[t]}$, the terminal apparatus 200 computes $w^{[t+1]}=w^{[t]}-\eta^{[t]}\Delta^{[t]}$ (step S106).

The server 100 and all the terminal apparatuses 200 determine whether or not the end condition is satisfied. If the end condition is satisfied ("SATISFIED" in step S107), the server 100 and all the terminal apparatuses 200 update epoch t=t+1 and set $w=w^{[t]}$ and $w'=w'^{[t]}$ (step S200). Meanwhile, if the end condition is not satisfied ("NOT SATISFIED" in the step S107), step a is incremented (step S108), and the processes of the step S002 and the steps thereafter are repeated.

As a result of the above, the model parameters w and w' of the utilized neural network and the attacking neural network are updated, respectively.

As described, according to the present example embodiment, a model update parameter to be transmitted from the terminal apparatus 200 to the server 100 is encrypted and then transmitted and a model update parameter is also computed without being decrypted in the server 100. Further, since in the machine learning parts 201a and 201b, training using the training data for a simulated attack is performed, in addition to training using the primary training data, the resistance to inference attacks will be greatly improved.

While each example embodiment of the present invention has been described, it is to be understood that the present invention is not limited to the example embodiments above and that further modifications, replacements, and adjustments may be added without departing from the basic technical concept of the present invention. For instance, the network configuration, the configuration of each element, and the expression of each message shown in each drawing are examples to facilitate understanding of the present invention and are not limited to the configurations shown in the drawings.

For instance, the terminal apparatus 200 comprises the machine learning parts 201a and 201b and the training data storage parts 205a and 205b in the example embodiment described above, however, both of them may be configured to be integrated.

In the example embodiment described above, it is described that the model update parameters of the utilized neural network are computed after the computation of the model update parameters of the attacking neural network, however, the computation order is not limited thereto. Further, in the example embodiment described above, it is described that the model update parameters can be received from all of the m terminal apparatuses (m=1, . . . , M), however, the model update parameters may be computed before receiving the model update parameters from all the terminal apparatuses 200.

Figure 7:
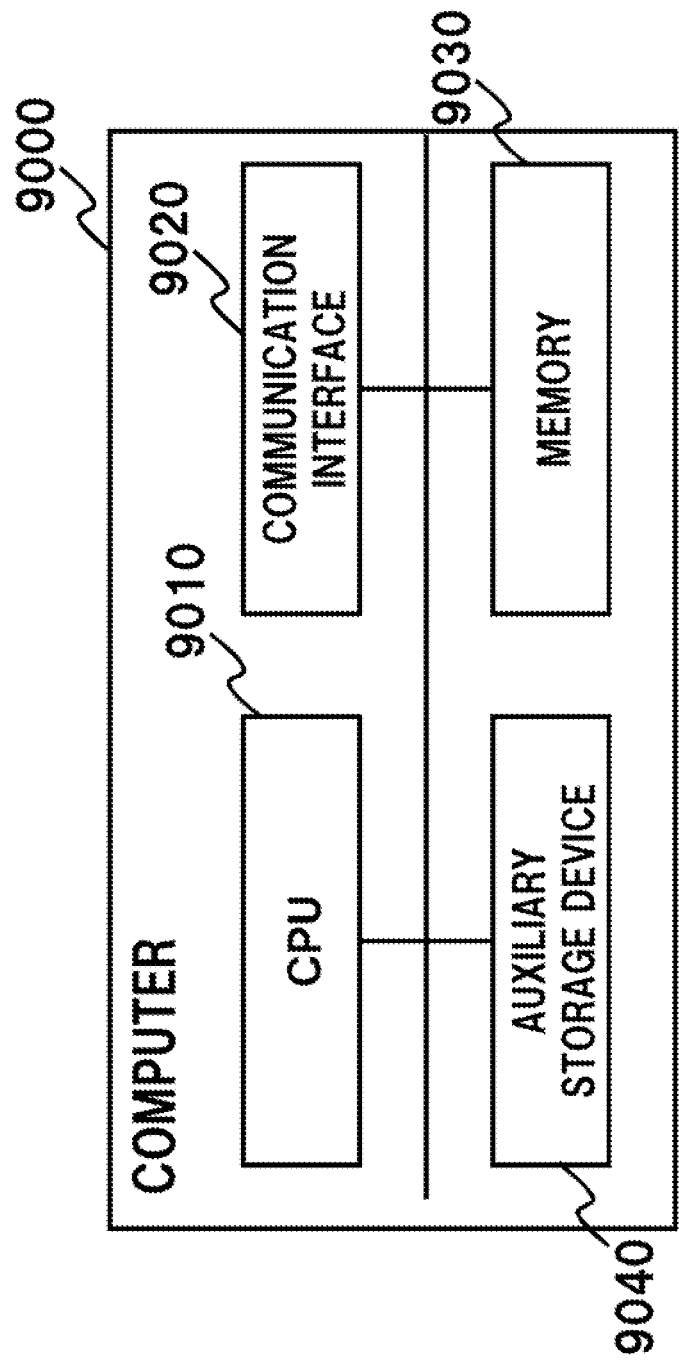
FIG. 7 is a drawing illustrating the configuration of a computer that constitutes a terminal apparatus or a server of the present invention.

Further, the procedure described in the example embodiment above can be implemented by a program causing a computer (9000 in FIG. 7) that functions as the server 100 and the terminal apparatus 200 to realize the functions of these apparatuses. FIG. 7 illustrates such a computer configured to comprise a CPU (Central Processing Unit) 9010, a communication interface 9020, a memory 9030, and an auxiliary storage device 9040. In other words, the CPU 9010 in FIG. 7 executes a machine learning program and an encryption/decryption program to update each computation parameter held by the auxiliary storage device 9040.

In other words, each part (each processing means or function) of the server 100 and the terminal apparatus 200 described in the example embodiment above can be realized by a computer program causing a processor installed in each of these apparatuses to execute each of the processes described above using the hardware thereof.

Finally, preferred modes of the present invention will be summarized.

[Mode 1]

(Refer to the terminal apparatus according to the first aspect.)

[Mode 2]

The machine learning part of the terminal apparatus may be configured to alternately execute the process of computing the first model update parameter of the first neural network and the process of computing the second model update parameter of the second neural network.

[Mode 3]

The terminal apparatus may be configured to share a hyperparameter with the another terminal apparatus and the computation apparatus and perform Horizontal Federated Learning.

[Mode 4]

The computation apparatus may be configured that the model update parameter of the first, the second neural network is computed, in the computation apparatus, by adding the model update parameters received from the terminal apparatuses in an encrypted state using additive homomorphic encryption.

[Mode 5]

The computation apparatus may be configured to be connected to a subserver that holds a decryption key distributed using a secret sharing scheme and decrypt the model update parameter of the first, the second neural network in cooperation with the subserver.

[Mode 6]

(Refer to the computation apparatus according to the second aspect.)

[Mode 7]

(Refer to the method for updating a neural network according to the third aspect.)

[Mode 8]

(Refer to the program according to the fourth aspect.)

Further, like Mode 1, Modes 6 to 8 can be developed into Modes 2 to 5.

[Mode 9]

A method for updating a neural network including:

executing a process of computing a first model update parameter of a first neural network using training data and a process of computing a second model update parameter of a second neural network, which is different from the first neural network, using training data for a simulated attack, which is different from the training data;

encrypting the first, the second model update parameter using a predetermined homomorphic encryption;

transmitting the encrypted first, second model update parameter to a predetermined computation apparatus; and receiving from the computation apparatus model update parameter of the first, the second neural network computed using the first, the second model update parameter received from another terminal apparatus and updating the first, the second neural network.

Further, the disclosure of each Patent Literature and Non-Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (including to partially remove) a wide variety of the disclosed elements (including the individual elements of the individual claims, the individual elements of the individual example embodiments or examples, and the individual elements of the individual figures) within the scope of the whole disclosure of the present invention. That is, the present invention of course includes any types of variations and modifications which could be done by those skilled in the art according to the whole disclosure including the Claims, and the technical concept of the present invention. In particular, with regard to numerical ranges described in the present specification, arbitrary numerical values and small ranges included in the relevant ranges should be interpreted to be specifically described even where there is no particular description thereof. In addition, each disclosure of above cited documents and also using a part or all thereof by combining with the disclosure of the present application are regarded as being included in the disclosure of the present application, as necessary, in accordance with the intent of the present invention, as a part of the disclosure of the present invention.

REFERENCE SIGNS LIST 10 computation apparatus
11, 101 computation part
12, 102 transmission part
20 terminal apparatus
21, 201a, 201b machine learning part
22, 202 encryption processing part
23, 203 data transmission part
24, 204 update part
100 server
200-1 to 200-M terminal apparatus
205a, 205b training data storage part
300 subserver
9000 computer
9010 CPU
9020 communication interface
9030 memory
9040 auxiliary storage device

What is claimed is:

1. A terminal apparatus comprising:
at least a processor; and
a memory in circuit communication with the processor,
wherein the processor is configured to execute program instructions stored in the memory to implement:
a machine learning part that:
executes a process of computing a first model update parameter of a first neural network using first training data; and
executes a process of computing a second model update parameter of a second neural network, using second training data for a simulated attack, the second neural network different from the first neural network, the second training data different from the first training data;
an encryption processing part that encrypts the first and second model update parameters using a predetermined homomorphic encryption;
a data transmission part that transmits the encrypted first and second model update parameters to a predetermined computation apparatus; and
an update part that:
receives, from the predetermined computation apparatus, overall model update parameters of the first and second neural networks computed by the predetermined computation apparatus using the first and second model update parameters that the predetermined computation apparatus received from each of the terminal apparatus and at least one other terminal apparatus; and
updates the first and second neural networks using the overall model updated parameters received from the predetermined computation apparatus,
wherein the terminal apparatus shares a hyperparameter with the at least one other terminal apparatus and the predetermined computation apparatus and performs Horizontal Federated Learning.

2. The terminal apparatus according to claim 1, wherein the machine learning part alternately executes the process of computing the first model update parameter of the first neural network and the process of computing the second model update parameter of the second neural network.

3. The terminal apparatus according to claim 1, wherein the overall model update parameters of the first and second neural networks is computed by in the predetermined computation apparatus by:
adding the first model update parameters received from the terminal apparatus and the at least one other terminal apparatus in an encrypted state using additive homomorphic encryption; and
adding the second model update parameters received from the terminal apparatus and the at least one other terminal apparatus in the encrypted state using the additive homomorphic encryption.

4. A computation apparatus capable of communicating with a terminal apparatus,
wherein the terminal apparatus comprises: comprising:
at least a processor; and
a memory in circuit communication with the processor,
wherein the processor is configured to execute program instructions stored in the memory to implement:
a machine learning part that:
executes a process of computing a first model update parameter of a first neural network using first training data; and
executes a process of computing a second model update parameter of a second neural network using second training data for a simulated attack, the second neural network different from the first neural network, the second training data different from the first training data;
an encryption processing part that encrypts the first and second model update parameters using a predetermined homomorphic encryption;
a data transmission part that transmits the encrypted first and second model update parameters to the computation apparatus; and
an update part that:
receives, from the computation apparatus, overall model update parameters of the first and second neural networks computed by the computation apparatus using the first and second model update parameters that the computation apparatus received from each of the terminal apparatus and at least one other terminal apparatus; and updates the first and second neural networks using the overall model updated parameters received from the computation apparatus, wherein the computation apparatus comprises:

a computation part that computes the overall model update parameters of the first and second neural networks using the first and second model update parameters received from each of the terminal apparatus and the at least one other terminal apparatus; and a transmission part that transmits the overall model update parameters of the first and second neural networks to the terminal apparatus.

5. The computation apparatus according to claim 4, wherein the computation part computes the overall model update parameters of the first and second neural networks by:

adding the first model update parameters received from the terminal apparatus and the at least one other terminal apparatus in an encrypted state using additive homomorphic encryption; and adding the second model update parameters received from the terminal apparatus and the at least one other terminal apparatus in the encrypted state using the additive homomorphic encryption.

6. The computation apparatus according to claim 4, wherein the computation apparatus is connected to a subserver that holds a decryption key distributed using a secret sharing scheme, and wherein the computation part decrypts the overall model update parameters of the first and second neural networks in cooperation with the subserver.

7. The computation apparatus according to claim 6, wherein the decrypting is performed by threshold decryption.

8. The computation apparatus according to claim 7, wherein the threshold decryption uses a k-out-of-n secret sharing scheme.

9. A computer-readable non-transient recording medium storing a program causing a terminal apparatus to execute:

executing a process of computing a first model update parameter of a first neural network using first training data;

executing a process of computing a second model update parameter of a second neural network using second training data for a simulated attack, the second neural network different from the first neural network, the second training data different from the first training data;

encrypting the first and second model update parameters using a predetermined homomorphic encryption;

transmitting the encrypted first and second model update parameters to a predetermined computation apparatus;

receiving, from the predetermined computation apparatus, overall model update parameters of the first and second neural networks computed by the predetermined computation apparatus using the first and second model update parameters that the predetermined computation apparatus received from each of the terminal apparatus and at least one other terminal apparatus; and updating the first and second neural networks using the overall model updated parameters received from the predetermined computation apparatus, wherein the terminal apparatus shares a hyperparameter with the at least one other terminal apparatus and the predetermined computation apparatus and performs Horizontal Federated Learning.

10. The medium according to claim 9, wherein the process of computing the first model update parameter of the first neural network and the process of computing the second model update parameter of the second neural network are alternately executed.

11. The medium according to claim 9, wherein the overall model update parameters of the first and second neural networks is computed by the predetermined computation apparatus by:

adding the first model update parameters received from the terminal apparatus and the at least one other terminal apparatus in an encrypted state using additive homomorphic encryption; and adding the second model update parameters received from the terminal apparatus and the at least one other terminal apparatus in the encrypted state using the additive homomorphic encryption.

12. The medium according to claim 9, wherein the overall model update parameters of the first and second neural networks received from the predetermined computation apparatus are decrypted using threshold decryption.

13. The medium according to claim 12, wherein the threshold decryption uses a k-out-of-n secret sharing scheme.

* * * * *